United States Patent
Chen et al.

(10) Patent No.: US 12,323,701 B2
(45) Date of Patent: Jun. 3, 2025

(54) APPARATUS AND METHOD FOR CONTROLLING IMAGE SENSOR, STORAGE MEDIUM, AND MOVABLE OBJECT

(71) Applicant: NIO TECHNOLOGY (ANHUI) CO., LTD, Hefei (CN)

(72) Inventors: Jiong Chen, Shanghai (CN); Xianglong Gao, Shanghai (CN); Yunyue Cai, Shanghai (CN); Hao Rong, Shanghai (CN); Yan Shi, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 81 days.

(21) Appl. No.: 17/837,399

(22) Filed: Jun. 10, 2022

(65) Prior Publication Data

US 2022/0400204 A1    Dec. 15, 2022

(30) Foreign Application Priority Data

Jun. 10, 2021   (CN) .......................... 202110647288.1

(51) Int. Cl.
*H04N 23/667* (2023.01)
*H04N 23/61* (2023.01)

(52) U.S. Cl.
CPC ........... *H04N 23/667* (2023.01); *H04N 23/61* (2023.01)

(58) Field of Classification Search
CPC ...... H04N 23/667; H04N 23/61; H04N 23/65; H04N 25/40; H04N 23/665; H04N 23/54; H04N 23/70
See application file for complete search history.

(56) References Cited

U.S. PATENT DOCUMENTS 5,638,116 A * 6/1997 Shimoura ............... H04N 7/183
                                                      348/169
8,879,050 B2 * 11/2014 Ko ......................... G01S 17/894
                                                      356/3.01

(Continued)

FOREIGN PATENT DOCUMENTS

| CN | 109466548 | 3/2019 |
| CN | 111527743 | 8/2020 |
| CN | 111767910 | 10/2020 |

OTHER PUBLICATIONS

Extended Search Report for European Patent Application No. 22165007.0, dated Sep. 20, 2022, 9 pages.

(Continued)

*Primary Examiner* — Timothy J Henn
(74) *Attorney, Agent, or Firm* — Sheridan Ross P.C.

(57) ABSTRACT

The disclosure relates to an apparatus and a method for controlling an image sensor, a storage medium, and a movable object. The apparatus for controlling an image sensor includes: a data obtaining unit configured to obtain parameter data related to one or more moving scenarios; and an instruction generation unit configured to generate, based on the parameter data, an instruction for controlling operation modes of the image sensor, where the moving scenarios are scenarios in which a movable object with the image sensor is located; and the operation modes correspond to setting manners of active pixels of the image sensor. According to the solutions of one or more embodiments of the disclosure, different operation modes are set for the image sensor in different scenarios, so that while sensing requirements in different scenarios are met, the power consumption can be reduced and requirements for a system can be lowered as far as possible.

9 Claims, 8 Drawing Sheets

(56) References Cited

U.S. PATENT DOCUMENTS

| | | | |
|---|---|---|---|
| 11,363,188 B2* | 6/2022 | Price | H04N 23/6812 |
| 2006/0125919 A1* | 6/2006 | Camilleri | B60R 1/00 |
| | | | 348/148 |
| 2006/0171704 A1* | 8/2006 | Bingle | B60R 11/04 |
| | | | 396/419 |
| 2006/0257135 A1* | 11/2006 | Kawada | H04N 23/65 |
| | | | 348/E5.042 |
| 2015/0049168 A1 | 2/2015 | Dielacher et al. | |
| 2015/0271411 A1 | 9/2015 | Wang et al. | |
| 2015/0350607 A1* | 12/2015 | Kim | B60R 1/00 |
| | | | 348/148 |
| 2017/0006239 A1 | 1/2017 | Zhou et al. | |
| 2018/0376054 A1* | 12/2018 | Patel | H04N 23/90 |
| 2019/0020810 A1* | 1/2019 | Kim | H04N 19/156 |
| 2019/0361454 A1 | 11/2019 | Zeng et al. | |
| 2020/0084388 A1 | 3/2020 | Iinuma et al. | |
| 2020/0226377 A1 | 7/2020 | Campos et al. | |
| 2020/0228740 A1* | 7/2020 | Otaka | H04N 25/772 |
| 2021/0152732 A1* | 5/2021 | Eki | A61B 1/043 |
| 2021/0218884 A1* | 7/2021 | Nishiyama | H04N 23/80 |
| 2021/0235005 A1* | 7/2021 | Koga | G06V 40/10 |

OTHER PUBLICATIONS

Official Action with Machine Translation for China Patent Application No. 202110647288.1, dated Mar. 13, 2024, 13 pages.
Official Action for European Patent Application No. 22165007.0, dated Oct. 24, 2024, 8 pages.

\* cited by examiner

Low-illumination and low-speed mode

| Type | FOV | | Pixel | After Binning |
|---|---|---|---|---|
| Front-view | x1 | 120° | 8M | 2M |
| Front-view | x1 | 30° | 8M | 2M |
| Rear-view | x1 | 70° | 8M | 2M |
| Side front-view | x2 | 120° | 8M | 2M |
| Side rear-view | x2 | 120° | 8M | 2M |

FIG. 4a

Low-illumination and high-speed mode

| Type | FOV | | Pixel | After Binning |
|---|---|---|---|---|
| Front-view | x1 | 120° | 8M | 8M |
| Front-view | x1 | 30° | 8M | 8M |
| Rear-view | x1 | 70° | 8M | 2M |
| Side front-view | x2 | 120° | 8M | 2M |
| Side rear-view | x2 | 120° | 8M | 2M |

FIG. 4b

High-illumination and low-speed mode

| Type | FOV | | Pixel | After Skipping |
|---|---|---|---|---|
| Front-view | x1 | 120° | 8M | 2M |
| Front-view | x1 | 30° | 8M | Disable |
| Rear-view | x1 | 70° | 8M | 2M |
| Side front-view | x2 | 120° | 8M | 2M |
| Side rear-view | x2 | 120° | 8M | 2M |

*FIG. 4c*

High-illumination and high-speed mode

| Type | FOV | | Pixel | After Skipping |
|---|---|---|---|---|
| Front-view | x1 | 120° | 8M | 2M |
| Front-view | x1 | 30° | 8M | 8M |
| Rear-view | x1 | 70° | 8M | 2M |
| Side front-view | x2 | 120° | 8M | 2M |
| Side rear-view | x2 | 120° | 8M | 2M |

*FIG. 4d*

APPARATUS AND METHOD FOR CONTROLLING IMAGE SENSOR, STORAGE MEDIUM, AND MOVABLE OBJECT

CROSS-REFERENCE TO RELATED APPLICATION

This application claims the benefit of China Patent Application No. 202110647288.1 filed Jun. 10, 2021, the contents of which are incorporated herein by reference in its entirety.

TECHNICAL FIELD

The disclosure relates to the technical field of intelligent driving. Specifically, the disclosure relates to an apparatus and a method for controlling an image sensor, a storage medium, and a movable object.

BACKGROUND ART

In the fields of advanced driving assistance, semi-autonomous driving, full self-driving, etc., various sensors are usually used to obtain operation information of parts of a driving object (such as a vehicle, an aircraft, or a ship) and information of an environment around the driving object, thereby providing a reference for driving operations.

Common sensors used for the foregoing purpose include radars, image sensors, light sensors, temperature sensors, pressure sensors, etc. The image sensor can be used to obtain an intuitive image representation of the real world around a driving object and is thus applied to various aspects such as surround view, front/rear view, lane-changing assistance, and parking assistance.

SUMMARY OF THE DISCLOSURE

According to an aspect of the disclosure, an apparatus for controlling an image sensor is provided, the apparatus including: a data obtaining unit configured to obtain parameter data related to one or more moving scenarios; and an instruction generation unit configured to generate, based on the parameter data, an instruction for controlling operation modes of the image sensor, where the moving scenarios are scenarios in which a movable object with the image sensor is located; and the operation modes correspond to setting manners of active pixels of the image sensor.

As an alternative or addition to the foregoing solution, the apparatus for controlling an image sensor according to an embodiment of the disclosure further includes: a data processing unit configured to determine, based on the parameter data, a specific moving scenario from among the plurality of moving scenarios; and a sensor control unit configured to control the operation modes of the image sensor in response to the instruction; and the instruction generation unit is further configured to generate, based on the determined specific moving scenario, the instruction for controlling the operation modes of the image sensor.

As an alternative or addition to the foregoing solution, in the apparatus for controlling an image sensor according to an embodiment of the disclosure, the plurality of operation modes include a default mode, a skipping mode, and a combination mode, and the default mode includes a mode in which a first set of pixels corresponding to a highest resolution of the image sensor serves as the active pixels; the skipping mode includes one or more skipping sub-modes in which pixels are selected from each of one or more subsets in the first set of pixels to serve as the active pixels; and the combination mode includes one or more combination sub-modes in which pixels from one or more subsets in the first set of pixels are combined to serve as the active pixels.

As an alternative or addition to the foregoing solution, in the apparatus for controlling an image sensor according to an embodiment of the disclosure, the parameter data includes at least one of the following: an ambient light illumination which represents a light intensity of an environment in which the movable object is located; a movement speed which represents a moving speed of the movable object; and a sensing distance which represents a distance between an object sensed by the image sensor and the movable object.

As an alternative or addition to the foregoing solution, in the apparatus for controlling an image sensor according to an embodiment of the disclosure, the instruction generation unit is further configured to generate, according to a specific requirement, the instruction for controlling the operation modes of the image sensor, the specific requirement including at least one of a bandwidth requirement, a power consumption requirement, and a computing power requirement.

As an alternative or addition to the foregoing solution, in the apparatus for controlling an image sensor according to an embodiment of the disclosure, the instruction generation unit is further configured to: generate, corresponding to a position at which the image sensor is disposed, the corresponding instruction for controlling the operation modes of the image sensor.

As an alternative or addition to the foregoing solution, in the apparatus for controlling an image sensor according to an embodiment of the disclosure, the active pixels are pixels for constituting a sensing image.

As an alternative or addition to the foregoing solution, in the apparatus for controlling an image sensor according to an embodiment of the disclosure, the ambient light illumination is obtained by the image sensor and/or a light sensor.

According to another aspect of the disclosure, a method for controlling an image sensor is provided, the method including: a data obtaining step of obtaining parameter data related to one or more moving scenarios; and an instruction generation step of generating, based on the parameter data, an instruction for controlling operation modes of an image sensor, where the moving scenarios are scenarios in which a movable object with the image sensor is located; and the operation modes correspond to setting manners of active pixels of the image sensor.

As an alternative or addition to the foregoing solution, the method for controlling an image sensor according to an embodiment of the disclosure further includes: a data processing step of determining, based on the parameter data, a specific moving scenario from among the plurality of moving scenarios; and a sensor control step of controlling the operation modes of the image sensor in response to the instruction; and the instruction generation step further includes generating, based on the determined specific moving scenario, the instruction for controlling the operation modes of the image sensor.

As an alternative or addition to the foregoing solution, in the method for controlling an image sensor according to an embodiment of the disclosure, the plurality of operation modes include a default mode, a skipping mode, and a combination mode, and the default mode includes a mode in which a first set of pixels corresponding to a highest resolution of the image sensor serves as the active pixels; the skipping mode includes one or more skipping sub-modes in which pixels are selected from each of one or more subsets in the first set of pixels to serve as the active pixels; and the combination mode includes one or more combination sub-modes in which pixels from one or more subsets in the first set of pixels are combined to serve as the active pixels.

As an alternative or addition to the foregoing solution, in the method for controlling an image sensor according to an embodiment of the disclosure, the parameter data includes at least one of the following: an ambient light illumination which represents a light intensity of an environment in which the movable object is located; a movement speed which represents a moving speed of the movable object; and a sensing distance which represents a distance between an object sensed by the image sensor and the movable object.

As an alternative or addition to the foregoing solution, in the method for controlling an image sensor according to an embodiment of the disclosure, the instruction generation step further includes: generating, according to a specific requirement, the instruction for controlling the operation modes of the image sensor, the specific requirement including at least one of a bandwidth requirement, a power consumption requirement, and a computing power requirement.

As an alternative or addition to the foregoing solution, in the method for controlling an image sensor according to an embodiment of the disclosure, the instruction generation step further includes: generating, corresponding to a position at which the image sensor is disposed, the corresponding instruction for controlling the operation modes of the image sensor.

As an alternative or addition to the foregoing solution, in the method for controlling an image sensor according to an embodiment of the disclosure, the active pixels are pixels for constituting a sensing image.

As an alternative or addition to the foregoing solution, in the method for controlling an image sensor according to an embodiment of the disclosure, the ambient light illumination is obtained by the image sensor and/or a light sensor.

According to still another aspect of the disclosure, there is provided a computer-readable storage medium having stored thereon program instructions executable by a processor, where when the program instructions are executed by the processor, the method for controlling an image sensor according to any embodiment of an aspect of the disclosure is implemented.

According to a further aspect of the disclosure, a movable object is provided, including the apparatus for controlling an image sensor according to any embodiment of an aspect of the disclosure.

As an alternative or addition to the foregoing solution, the movable object according to an embodiment of the disclosure is any one or more of a vehicle, a ship, an aircraft, and an elevator car.

According to the solutions of one or more embodiments of the disclosure, different operation modes are set for the image sensor in different scenarios, so that while sensing requirements in different scenarios are met, the power consumption can be reduced and requirements for a system can be lowered as far as possible.

BRIEF DESCRIPTION OF THE DRAWINGS

The above-mentioned and/or other aspects and advantages of the disclosure will become clearer and more comprehensible from the following description of various aspects with reference to the accompanying drawings, and the same or similar units in the accompanying drawings are denoted by the same reference numerals. In the drawings:

FIGS. 4a-4d show configuration examples of image sensors disposed at different positions of a vehicle in different specific scenarios.

DETAILED DESCRIPTION OF EMBODIMENTS

In this specification, the disclosure is described more fully with reference to the accompanying drawings in which schematic embodiments of the disclosure are illustrated. However, the disclosure may be implemented in different forms, and should not be construed as being limited to the embodiments provided herein. The embodiments provided herein are intended to make the disclosure of this specification full and complete, to convey the scope of protection of the disclosure more fully to those skilled in the art.

The terms such as "include" and "comprise" indicate that in addition to the units and steps that are directly and clearly described in the specification and the claims, other units and steps that are not directly or clearly described are not excluded in the technical solutions of the disclosure. The terms such as "first" and "second" are not used to indicate sequences of units in terms of time, space, size, etc., and are merely used to distinguish between the units.

The disclosure is described below with reference to the flowchart descriptions, the block diagram and/or the flowchart of the method and system according to the embodiments of the disclosure. It should be understood that these flowchart descriptions and/or each block in the block diagram, and combinations of the flowchart descriptions and/or the block diagram, can be implemented by computer program instructions. These computer program instructions may be provided to a processor of a general-purpose computer, a dedicated computer, or other programmable data processing units to constitute a machine, so that the instructions executed by the processor of the computer or the other programmable data processing units create components for implementing the functions/operations specified in these flowcharts and/or blocks and/or one or more flow block diagrams. It should also be noted that in some alternative implementations, the functions/operations shown in the blocks may not occur in the order shown in the flowchart. For example, two blocks shown in sequence may actually be executed substantially simultaneously or the blocks may sometimes be executed in a reverse order, depending on the functions/operations involved.

Various embodiments provided in the disclosure may be implemented by hardware, software, or a combination of hardware and software where applicable. In addition, without departing from the scope of the disclosure, various hardware components and/or software components described in this specification may be combined into a combined component including software, hardware, and/or both where applicable. Without departing from the scope of the disclosure, various hardware components and/or software components described in this specification may be separated into sub-components including software, hardware, or both where applicable. In addition, where applicable, it is contemplated that software components may be implemented as hardware components, and vice versa.

Figure 1:
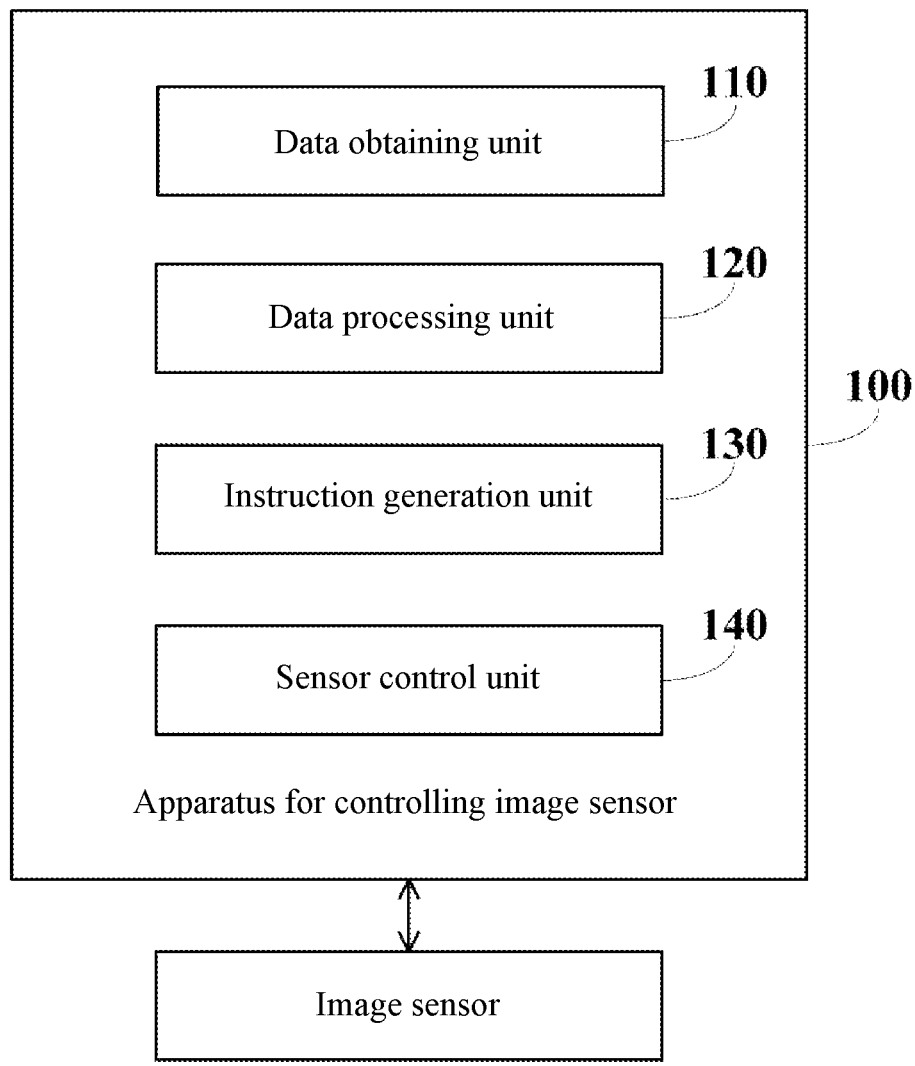
FIG. 1 is a schematic block diagram of an apparatus 100 for controlling an image sensor according to an embodiment of the disclosure.

Referring to FIG. 1 now, FIG. 1 is a schematic block diagram of an apparatus 100 for controlling an image sensor according to an embodiment of the disclosure. In FIG. 1, the apparatus 100 for controlling an image sensor may include a data obtaining unit 110, a data processing unit 120, an instruction generation unit 130, and a sensor control unit 140.

In an embodiment, the apparatus 100 for controlling an image sensor may include the data obtaining unit 110 and the instruction generation unit 130. The image sensor may be at least one of an image acquisition device and a video acquisition device. Commonly, the image acquisition device and the video acquisition device may be a camera lens and a camera, for example, an analog camera, a digital camera, a night vision camera, an infrared camera, a camera with various fields of view (FOV), etc. When a plurality of cameras are used, data fusion can be performed on images acquired by the plurality of cameras, to obtain a more accurate result.

The data obtaining unit 110 may be configured to obtain parameter data related to one or more moving scenarios. The moving scenarios are scenarios in which a movable object with the image sensor is located. The movable object may be a vehicle, an aircraft, a ship, etc., and correspondingly, types of the moving scenarios may be road, air, water, etc. For the sake of brevity, a vehicle is used as an example of a movable object for description hereinafter. However, it should be understood that where applicable, the solutions according to the disclosure can be applied to scenarios associated with a vehicle, an aircraft, a ship, and other movable objects (such as an elevator).

In the example of the vehicle according to the disclosure, a high-pixel (for example, 8M-pixel) camera and a high-bandwidth and high-computing-power domain controller may be included in, for example, a visual perception system for autonomous driving. There are a series of dependency and constraint relationships between a total number of pixels of the image sensor and a number of pixels per unit area thereof, and a farthest distance detected based on a target detection algorithm, a signal-to-noise ratio and responsivity under different illumination conditions, a system bandwidth, a computing power of the domain controller, power consumption, etc. Moreover, the zoom mode of a single image sensor itself provides underlying technical support for configuration of different modes in different application scenarios. An objective of the disclosure is to configure the image sensor to operate in different operation modes according to different application scenarios, to meet requirements in different application scenarios and reduce power consumption of the system as far as possible.

In the example of the vehicle, the parameter data related to the moving scenarios of the vehicle may be, but is not limited to, any one or more of the following: an ambient light illumination, a movement speed, a sensing distance, etc.

The ambient light illumination represents a light intensity of an environment in which the movable object (for example, the vehicle) is located, and can be obtained by the image sensor and/or a light sensor. In an embodiment, image data obtained by the image sensor may be provided to a processing unit (for example, the data processing unit 120), such that the processing unit may extract information about luminance from the image data to obtain the luminance of a scenario displayed in the image. For example, the ambient light illumination may be obtained by using a luminance average of pixel data of the image. In addition, the ambient light illumination may be obtained by using a statistical value of pixel luminance of the image sensor. In another embodiment, the ambient light illumination may be obtained by disposing a special light sensor. The ambient light illumination may be obtained by alternatively using the image sensor or the light sensor, or by jointly using the two (for example, data from the image sensor and data from the light sensor are fused, complemented and corrected) to obtain the ambient light illumination.

The movement speed represents a moving speed of the movable object. Generally, the moving speed is a relative moving speed of the movable object, on which the image sensor is located, with respect to the environment (for example, ground, air, water, an elevator shaft, etc.). In this case, information about the movement speed of the vehicle may be obtained by using a sensor such as a wheel speedometer. In other cases of vehicles, for example, in a jam scenario in which a vehicle is closely surrounded by many other vehicles, the movement speed may also represent a moving speed of a vehicle, on which the image sensor is located, with respect to the surrounding vehicles.

The sensing distance represents a distance between an object sensed by the image sensor and the movable object. For example, when a user wants to see a distant scenario or object using the image sensor, more active pixels can be set, which makes it much easier for the user to distinguish objects appearing in the distant scenario, and vice versa.

Although only three examples of the parameter data are given here, it should be understood that the parameter data may be any parameter data related to the moving scenarios that may be required for adjustment to settings of the active pixels of the image sensor. For example, the parameter data may be the number of obstacles within a certain range around the vehicle, etc.

The instruction generation unit 130 may be configured to generate, based on the parameter data, an instruction for controlling operation modes of the image sensor, where the operation modes correspond to setting manners of active pixels of the image sensor. In some embodiments, the active pixels may be pixels for constituting a sensing image. In some embodiments, the active pixels may be sampled pixels. Sets of active pixels defined in different ways may coincide or intersect.

For a multi-frame sensing image, and with reference to a high-resolution sensing mode (also referred to as "default mode" hereinafter) of the image sensor, the active pixels may vary in terms of number, and positions of the active pixels in an image (also referred to as "highest-resolution image" hereinafter) obtained in the highest-resolution sensing mode may vary. In addition, a single active pixel may not only correspond to one pixel in the highest-resolution image, and may also correspond to a plurality of pixels or a set of pixels in the highest-resolution image.

When the instruction generation unit 130 generates, based on the parameter data, an instruction for controlling operation modes of the image sensor, the instruction generation unit may compare each piece of parameter data with a preset threshold and then generate an operation instruction based on a comparison result. This process is described in detail below.

In an embodiment, in consideration of the ambient light illumination, when a value of the obtained ambient light illumination is greater than a first preset ambient light illumination threshold, this indicates that a light intensity in an environment is enough for high-resolution imaging, and therefore, the instruction generation unit 130 may generate an instruction for controlling the image sensor to be maintained in the default mode or switch to the default mode. The default mode may include a mode in which a first set of pixels (for example, a set of all pixels of the image sensor) corresponding to a highest resolution of the image sensor serves as the active pixels. In other words, the default mode may correspond to a scenario in which imaging conditions are enough to generate a highest-quality image, and this is described as an example hereinafter. However, it should be understood that with the upgrade of hardware and more attention to user customization, a user may also select his/her desired default mode if permitted. For example, when driving a vehicle at night for a long term (in a scenario with a low value of ambient light illumination), a user may set the default mode as a mode that is favorable for nighttime sensing, such as a combination mode that will be described hereinafter. Alternatively, when expecting to save a system bandwidth or reduce power consumption, the user may set the default mode as a mode in which fewer pixels are sampled, such as a skipping mode that will be described hereinafter.

Figure 2A:
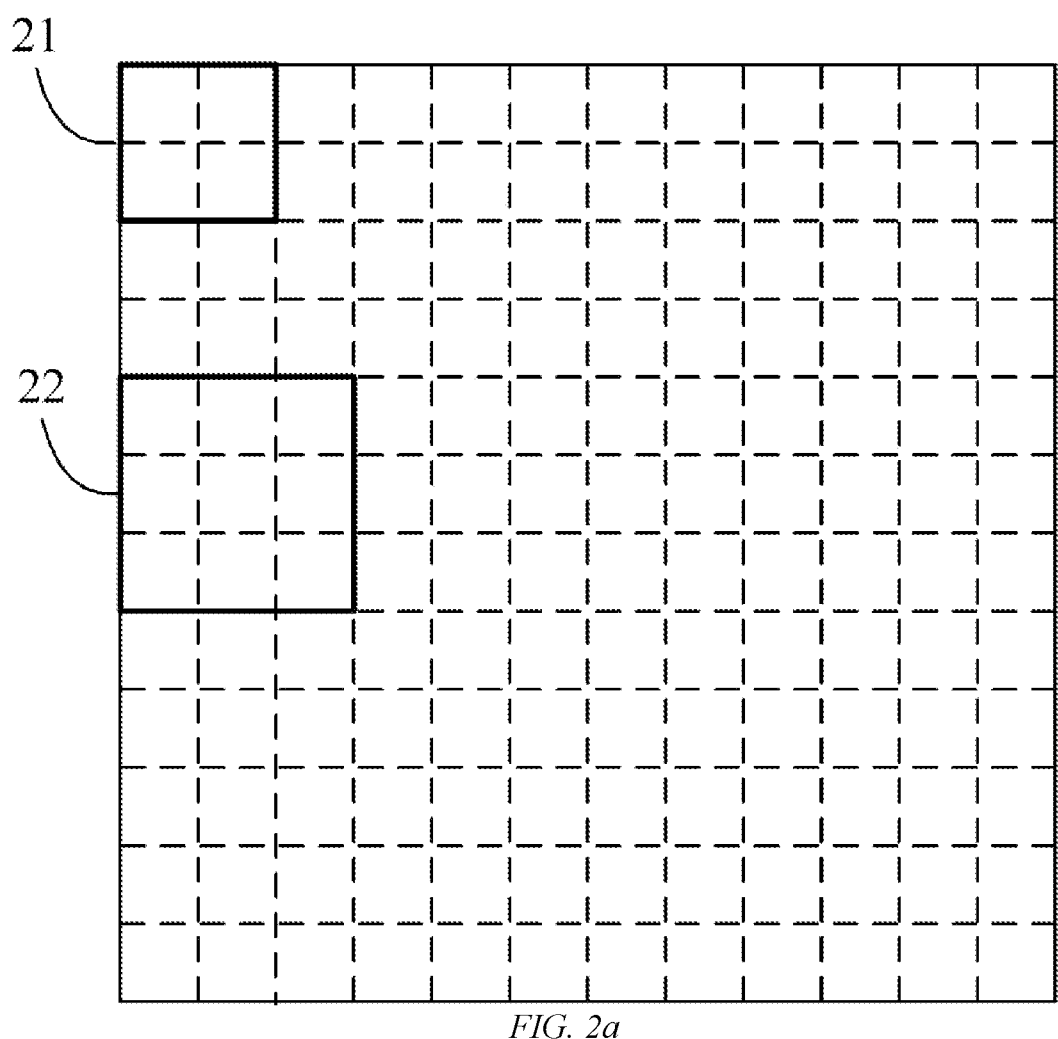
FIGS. 2a-2c are schematic diagrams of some examples of a combination mode and a skipping mode according to an embodiment of the disclosure.
Figure 2B:
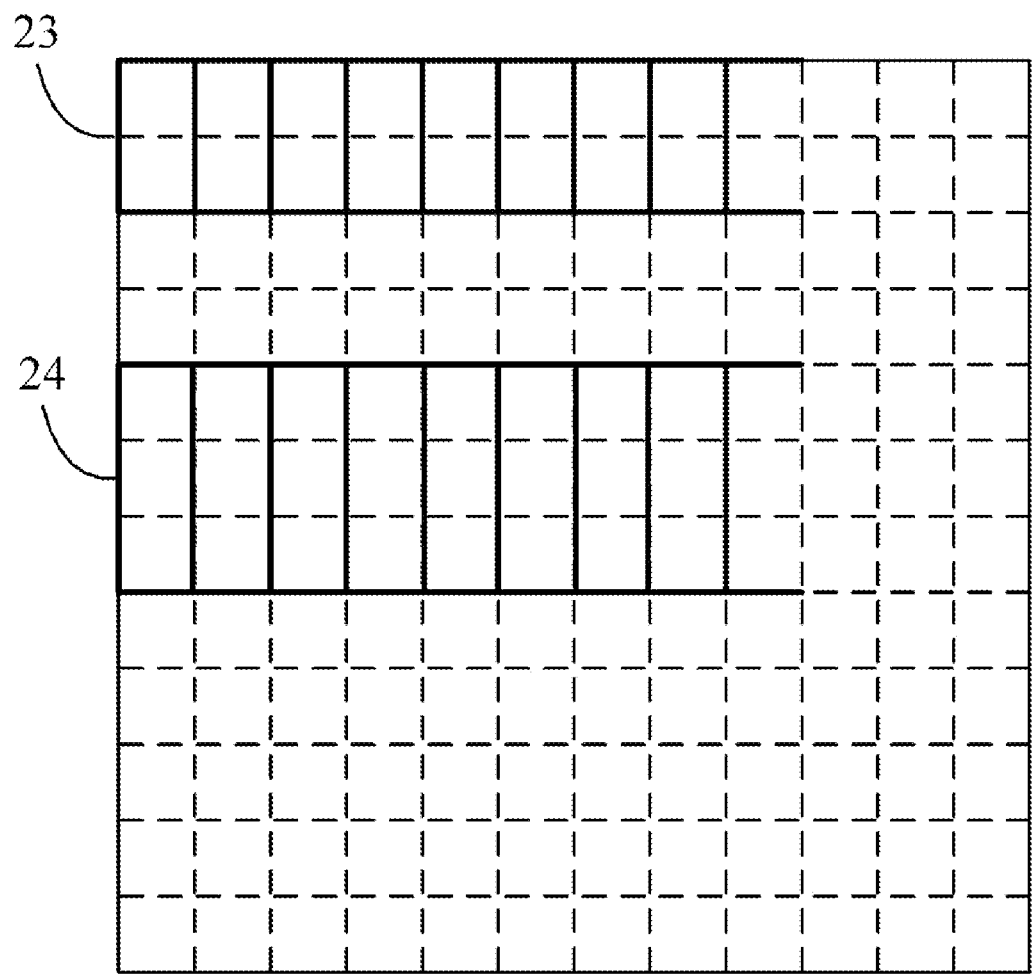

In an aspect, when the value of the obtained ambient light illumination is less than or equal to the first preset ambient light illumination threshold, this indicates that the light intensity in the environment is not enough for high-resolution imaging. Therefore, to prevent the frame of the sensing image from being too dark for human eyes to see and distinguish, the instruction generation unit 130 may generate an instruction for controlling the image sensor to enter the combination mode or to be maintained in the combination mode. Referring to FIGS. 2a and 2b, the combination mode may include, but is not limited to, the following one or more combination sub-modes in which pixels from one or more subsets in the first set of pixels are combined to serve as the active pixels.

In an embodiment, the combination mode is a specific binning mode. For example, in the binning mode, charges induced in adjacent pixels may be combined together and then read out in a mode of one pixel. In a case of horizontal binning, a specific number of charges in adjacent rows are combined together and then read out, and in a case of vertical binning, a specific number of charges in adjacent columns are combined together and then read out.

In each combination sub-mode, a pixel subset may be a set of pixels of different sizes in an active pixel array (for example, a 12*12 pixel array shown by dotted lines in FIG. 2a) in the default mode, for example, a set of pixels of M rows*N columns, where N and M are integers greater than one, and M and N may be the same or different. Pixels in each M*N pixel subset may be combined (for example, combined into one pixel). Correspondingly, a number of pixels in the image obtained in the combination sub-mode is 1/(M*N) that in the default mode.

For example, in an exemplary first combination sub-mode, M=N=2, each array of 2*2=4 pixels (as shown by 21 in FIG. 2a) may be combined into one active pixel, so that the luminance of the resulting pixel is greater than an average luminance of the four pixels, thereby improving the luminance of a resulting image. A number of pixels in the image formed by means of this method is ¼ that in the default mode, and the image resolution thus decreases.

In an exemplary second combination sub-mode, M=2, and N=1. For example, referring to FIG. 2b, two pixels (as shown by 23 in FIG. 2b) in corresponding columns of two rows may be combined into one active pixel. In an exemplary third combination sub-mode, M=3, and N=1. Three pixels (as shown by 24 in FIG. 2b) or more pixels in corresponding columns of three rows may be combined into one active pixel. In the second combination sub-mode, an aspect ratio of a combined image may be different from that of the image in the default mode, resulting in distortion of the scenario in the image. Therefore, this combination method may be less used.

In addition, values of M and N may be fixed so that there is only one combination sub-mode. Alternatively, the values may be adjusted as required so that there are multiple combination sub-modes available for selection. When the values of M and N are adjustable, a lower value of the ambient light illumination usually indicates higher values of M and N. In this case, more pixels are combined into a single or multiple active pixels, thereby improving the image luminance. A ratio of the number of pixels before combination to the number of pixels after combination may be flexible. For example, pixels in a 2*2 array may be combined into one active pixel (a ratio of 4:1). Pixels in a 3*3 array (as shown by 22 in FIG. 2a) may be combined into one active pixel (a ratio of 9:1), two active pixels (a ratio of 9:2), three active pixels (a ratio of 9:3), etc., depending on actual requirements.

In each combination sub-mode, the ratio of the number of pixels before combination to the number of pixels after combination or an arrangement of positions of the pixels after combination may be reasonably set such that an aspect ratio of the combined image is consistent with the aspect ratio of the image in the default mode. In addition, the pixel subsets may be reasonably intersected to reuse information of some pixels, thereby maintaining the aspect ratio of the image or meeting other requirements.

Although only several examples of combination sub-modes are given here, it should be understood that any combination method by which the resulting image can reach required luminance may be used in the combination sub-modes. For example, different combination methods may be used in different blocks or different zones according to values of luminance at different positions in the image, for example, different values of M and N are used for different regions of the image.

In another aspect, when the value of the obtained ambient light illumination is greater than the first preset ambient light illumination threshold, this indicates that the light intensity in the environment is enough for high-resolution imaging. In this case, the instruction generation unit 130 may be further configured to generate, according to a specific requirement such as a system requirement, the instruction for controlling the operation modes of the image sensor. The specific requirement includes any one or more of a bandwidth requirement, a power consumption requirement, and a computing power requirement. To save a system bandwidth and reduce power consumption, and perform matching with a computing power of the processing unit of the system, the skipping mode may be used where there is enough ambient light illumination. The skipping mode includes one or more skipping sub-modes in which pixels are selected from each of one or more subsets in the first set of pixels to serve as the active pixels.

In an embodiment, the skipping mode is a specific line skipping mode. For example, in the line skipping mode, some pixels may be selected, and only these pixels are sampled, thereby reducing resolution. Data of rows and columns may be read in pairs, and not each row or each column may be sampled, such that the image resolution is reduced.

Figure 2C:
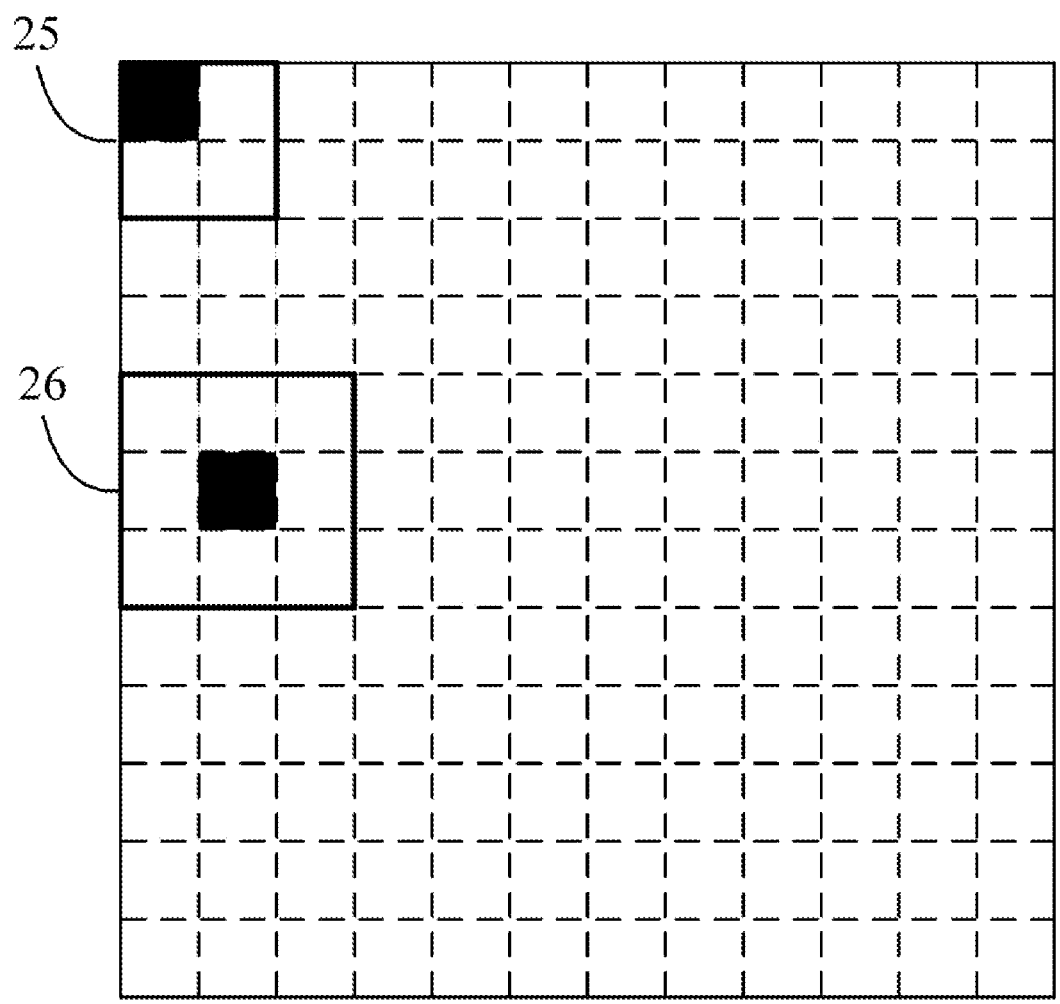

In each skipping sub-mode, each active pixel is selected from a subset of pixels of different sizes in an active pixel array (for example, a 12*12 pixel array shown by dotted lines in FIG. 2c) in the default mode, for example, a subset of pixels of M rows*N columns, where N and M are integers greater than one, and M and N may be the same or different. One or more pixels may be selected from each M*N pixel subset. Correspondingly, when one pixel is selected, a number of pixels in the image obtained in the skipping mode is 1/(M*N) that in the default mode.

For example, in an exemplary first skipping sub-mode, M=N=2, one active pixel (shown in black) may be selected from a subset of each array of 2*2=4 pixels (as shown by 25 in FIG. 2c), and sampling processing is performed only on the selected pixel, so that power used for sampling is reduced to some extent, and the number of pixels to be transmitted and processed is reduced, thereby saving bandwidths and reducing the required computing power. A number of pixels in the image formed by means of this method is ¼ that in the default mode, and the image resolution thus decreases. In an exemplary second skipping sub-mode, M=N=3, one active pixel (shown in black), two active pixels, three active pixels, etc. may be selected from a subset of a 3*3 array as shown by 26 in FIG. 2c, depending on actual requirements.

In addition, values of M and N may be fixed so that there is only one skipping sub-mode. Alternatively, the values may be adjusted as required so that there are multiple skipping sub-modes available for selection. When adjustable, a lower performance of the system in various aspects usually indicates higher values of N and M. In this case, a single or more active pixels are selected from an array composed of more pixels, thereby lowering the consumption and requirement of the performance of the system. A ratio of a number of pixels in a subset of an array of N*M pixels from which active pixels are selected to a number of active pixels selected from the subset may be flexible. For example, 2*3 active pixels may be selected from a subset of an array of 4*6 pixels for sampling.

In each skipping sub-mode, a ratio of the number of pixels in a pixel subset to the number of pixels selected from the subset or an arrangement of positions of the selected pixels may be reasonably set such that an aspect ratio of an image generated through a skipping operation is consistent with the aspect ratio of the image in the default mode. In addition, the pixel subsets may be reasonably intersected to reuse information of some pixels, thereby maintaining the aspect ratio of the image or meeting other requirements.

Although only several examples of skipping sub-modes are given here, it should be understood that any skipping method by which the power consumption of the system is reduced during image generation may be used in the skipping sub-modes. For example, different skipping methods may be used in different blocks or different zones according to values of luminance at different positions in the image, for example, different values of M and N are used for different regions of the image.

In an embodiment, the apparatus 100 for controlling an image sensor may further include the data processing unit 120. The data processing unit 120 may be configured to determine, based on the parameter data, a specific moving scenario from among the plurality of moving scenarios, and then provide the determined moving scenario to the instruction generation unit 130. Correspondingly, the instruction generation unit 130 may be configured to generate, based on the determined specific moving scenario that is received, the instruction for controlling the operation modes of the image sensor.

The instruction generation unit 130 may be further configured to generate, corresponding to a position at which the image sensor is disposed, the corresponding instruction for controlling the operation modes of the image sensor. For example, referring to FIG. 3, a schematic diagram showing positions at which a plurality of image sensors are mounted on a vehicle according to an embodiment is shown. In an example shown in FIG. 3, 7 8M-pixel image sensors of totally five types are disposed on the vehicle. A front-view image sensor of type 1 has a 120° field of view (FOV), and is mounted behind a front windshield of the vehicle; a front-view image sensor of type 2 has a 30° field of view and a sensing distance greater than that of type 1, and is also mounted behind the front windshield of the vehicle; a rear-view image sensor of type 3 has a 70° field of view, and is mounted on an upper edge of a rear window of the vehicle; two side front-view image sensors of type 4 have a 120° field of view, and are mounted at left and right A-pillar corners of the vehicle respectively; and two side rear-view image sensors of type 5 have a 120° field of view, and are mounted on left and right fenders of the vehicle respectively. It should be noted that FIG. 3 only shows an example of mounting of the image sensors on the vehicle. In practice, the number, types, mounting positions, and other settings of the image sensors may all be changed as appropriate.

Figure 3:
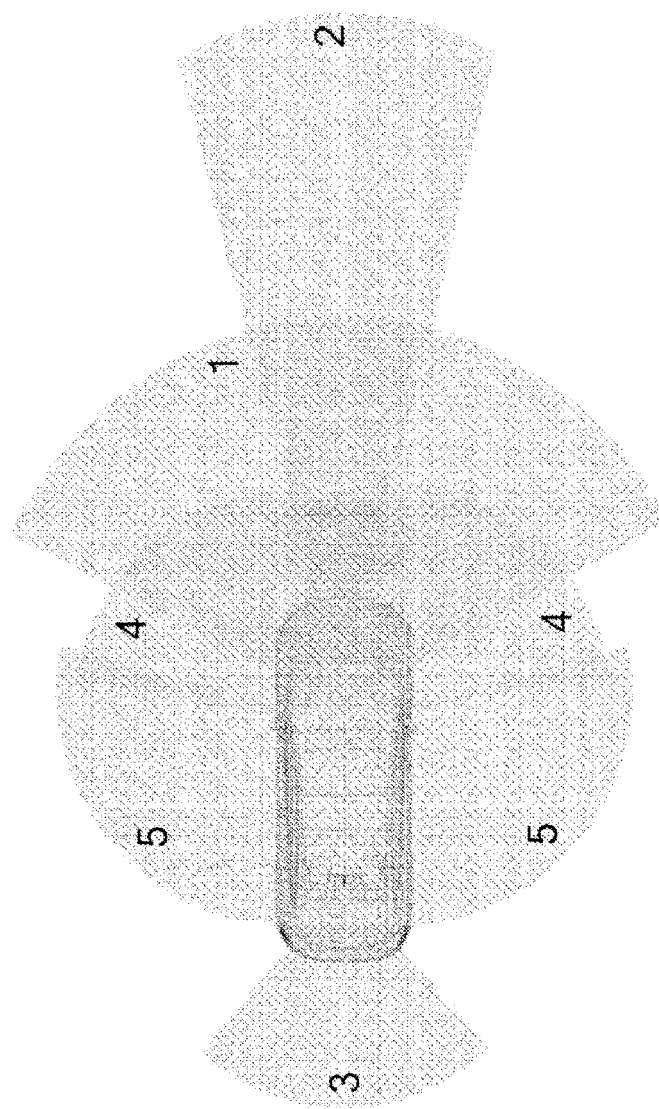
FIG. 3 is a schematic diagram showing positions at which a plurality of image sensors are mounted on a vehicle according to an embodiment of the disclosure.

Next, a configuration example of the data processing unit 120 is given by taking the image sensor in FIG. 3 as an example.

In a storage apparatus of a vehicle, one or more preset ambient light illumination thresholds, preset movement speed thresholds, preset sensing distance thresholds, etc. may be pre-stored for classification and determination of moving scenarios. A single preset ambient light illumination threshold and preset movement speed threshold is used as examples for description below. However, it should be understood that a plurality of thresholds of the same type may be set as needed, to more finely classify the moving scenarios.

In an embodiment, the data processing unit 120 may be configured to: determine a current scenario as a "low-illumination and low-speed" scenario when a value of the ambient light illumination does not exceed a first ambient light illumination threshold and the movement speed does not exceed a first movement speed threshold; determine the current scenario as a "low-illumination and high-speed" scenario when the value of the ambient light illumination does not exceed the first ambient light illumination threshold and the movement speed exceeds the first movement speed threshold; determine the current scenario as a "high-illumination and low-speed" scenario when the value of the ambient light illumination exceeds the first ambient light illumination threshold and the movement speed does not exceed the first movement speed threshold; and determine the current scenario as a "high-illumination and high-speed" scenario when the value of the ambient light illumination exceeds the first ambient light illumination threshold and the movement speed exceeds the first movement speed threshold.

In the "low-illumination and low-speed" scenario, the image sensor needs to have a large single-pixel light sensing area, to improve sensitivity to light in the scenario, thereby increasing a signal-to-noise ratio of imaging. In this case, the data processing unit 120 may provide the determined type of "low-illumination and low-speed" scenario to the instruction generation unit 130. The instruction generation unit 130 may generate, according to the scenario, an instruction for controlling the image sensor to enter the combination mode described above or to be maintained in the combination mode. In this way, pixels of the resulting sensing image are reduced to 1/(M*N) that in the default mode. As shown in FIG. 4a, when M=N=2, cameras of five types are all zoomed down from an 8M-pixel mode to a 2M-pixel mode.

In the "low-illumination and high-speed" scenario, the image sensor needs to have a large single-pixel light sensing area, to improve sensitivity to light in the scenario, thereby increasing a signal-to-noise ratio of imaging. However, a relatively high movement speed of the vehicle imposes a relatively high requirement for the detection distance. In consideration of safety, a high-pixel mode may still be used for a front-view camera of the vehicle. In this case, the data processing unit 120 may provide the determined type of "low-illumination and high-speed" scenario to the instruction generation unit 130. The instruction generation unit 130 may generate, according to the scenario, an instruction for controlling the image sensor, other than the front-view camera, to enter the combination mode described above or to be maintained in the combination mode. In this way, pixels of the resulting sensing image are reduced to 1/(M*N) that in the default mode. In addition, the instruction generation unit 130 may also generate, according to the scenario, an instruction for controlling the front-view camera to enter the default mode described above or to be maintained in the default mode. As shown in FIG. 4b, when M=N=2, except for two front-view cameras that are maintained in an 8M default mode, cameras of the other three types are all zoomed down from an 8M-pixel mode to a 2M-pixel mode.

In the "high-illumination and low-speed" scenario, there is a relatively good light condition, and therefore, an imaging effect is usually better than that in a low-illumination scenario. In addition, a requirement for the detection distance is usually lower than that in the high-speed scenario. In this case, the image sensor can operate in a low-pixel mode, thereby meeting the specific requirement of the system and relieving the burden of bandwidth and computing power on the system, and reducing indicators such as power consumption of the system. In this case, the data processing unit 120 may provide the determined type of "high-illumination and low-speed" scenario to the instruction generation unit 130. The instruction generation unit 130 may generate, according to the scenario, an instruction for controlling the image sensor to enter the skipping mode described above or to be maintained in the skipping mode. In this way, pixels of the resulting sensing image are reduced to 1/(M*N) that in the default mode. Since it is easier to obtain a high-quality sensing image in a moving scenario, in a case of ensuring safety, an instruction of turning off redundant front-view cameras may also be generated and only one or more necessary cameras remain turned on where there are a plurality of front-view cameras. In a case of more attention to safety, a high-pixel mode may still be used for the front-view camera of the vehicle. In this case, the instruction generation unit 130 may also generate, according to the scenario, an instruction for controlling the front-view camera to enter the default mode described above or to be maintained in the default mode. As shown in FIG. 4c, when M=N=2, cameras of four types are zoomed down from an 8M-pixel mode to a 2M-pixel mode, and one front-view camera with a larger sensing distance and a 30° field of view is turned off. With such a setting manner, the requirements for the bandwidth of the cameras and the computing power of the processing unit may be approximately lowered to ⅕ that in the default mode or even lower.

In the "high-illumination and high-speed" scenario, there is a relatively good light condition, and therefore, an imaging effect is usually better than that in the low-illumination scenario. In this case, the data processing unit 120 may provide the determined type of "high-illumination and low-speed" scenario to the instruction generation unit 130. The instruction generation unit 130 may generate, according to the scenario, an instruction for controlling the image sensor to enter the skipping mode described above or to be maintained in the skipping mode. In this way, pixels of the resulting sensing image are reduced to 1/(M*N) that in the default mode. However, a relatively high movement speed of the vehicle imposes a relatively high requirement for the detection distance. In consideration of safety, a high-pixel mode may still be used for a front-view camera of the vehicle. In this case, the instruction generation unit 130 may also generate, according to the scenario, an instruction for controlling the front-view camera to enter the default mode described above or to be maintained in the default mode. As shown in FIG. 4c, when M=N=2, cameras of four types are zoomed down from an 8M-pixel mode to a 2M-pixel mode, and one front-view camera with a larger sensing distance and a 30° field of view is maintained in an 8M-pixel default mode.

Although the moving scenarios are simply classified into two types, i.e. low illumination and high illumination, in terms of light intensity by using the single preset ambient light illumination threshold above, the moving scenarios may also be simply classified into two types, i.e. low illumination and high illumination, by setting, for example, two preset ambient light illumination thresholds.

For example, the data processing unit 120 may determine to enter a high-illumination scenario when the ambient light illumination exceeds a first ambient light illumination threshold, and determine to enter a low-illumination scenario when the ambient light illumination exceeds a second ambient light illumination threshold, where the second ambient light illumination threshold is less than the first ambient light illumination threshold by an appropriate amount. With such a setting manner, an increase in the amount of computation of the system caused by frequent switching of the scenario, which is determined by the data processing unit 120, between high illumination and low illumination when the ambient light illumination frequently fluctuates around the first ambient light illumination threshold can be avoided, thereby further reducing the power consumption of the system.

The configuration methods of cameras in some specific scenarios are only given above. In other scenarios not mentioned in this specification, the plurality of cameras can also be adaptively zoomed and adjusted as required. In addition, depending on the speed of computation for each movable object, detection and distance performances for a sensing algorithm, etc., whether to zoom the image sensor may be determined based on the time required for the system to perform corresponding manipulation and control over varying scenarios.

In an embodiment, the apparatus 100 for controlling an image sensor may further include a sensor control unit 140, which may be configured to control the operation modes of the image sensor in response to the instruction generated by the instruction generation unit 130, so that the image sensor exits a certain operation mode (for example, the default mode, the skipping mode, or the combination mode), is maintained in a certain operation mode, or switches to a certain operation mode.

Figure 5:
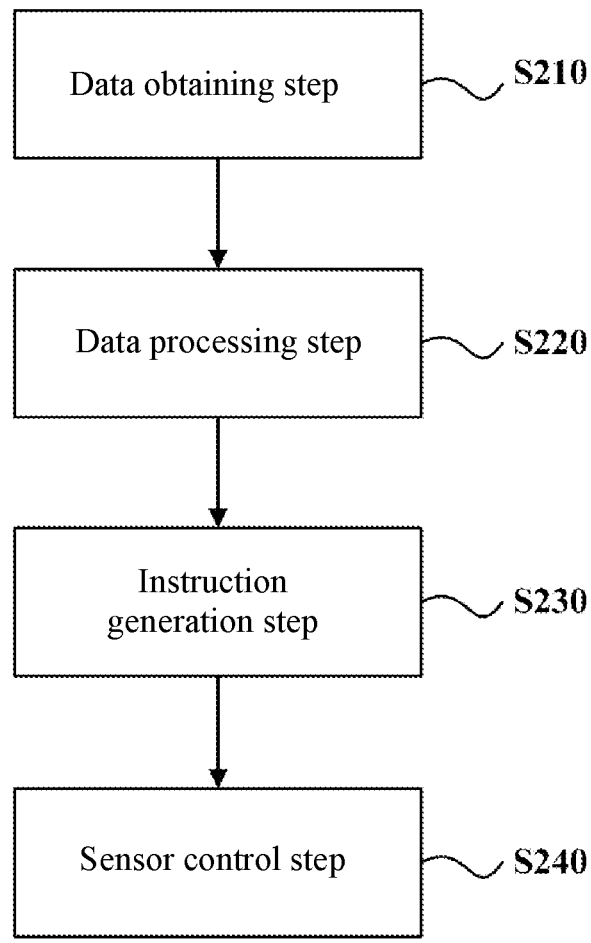
FIG. 5 is a schematic flowchart of a method 200 for controlling an image sensor according to an embodiment of the disclosure.

Referring to FIG. 5 now, FIG. 5 is a schematic flowchart of a method 200 for controlling an image sensor according to an embodiment of the disclosure. In FIG. 5, the method 200 for controlling an image sensor may include a data obtaining step S210, a data processing step S220, an instruction generation step S230, and a sensor control step S240.

In an embodiment, the method 200 for controlling an image sensor may include the data obtaining step S210 and the instruction generation step S230. The data obtaining step S210 may include obtaining parameter data related to one or more moving scenarios. The moving scenarios are scenarios in which a movable object with the image sensor is located. The movable object may be a vehicle, an aircraft, a ship, etc., and correspondingly, types of the moving scenarios may be road, air, water, etc. For the sake of brevity, a vehicle is used as an example of a movable object for description hereinafter. However, it should be understood that where applicable, the solutions according to the disclosure can be applied to scenarios associated with a vehicle, an aircraft, a ship, and other movable objects (such as an elevator).

In the example of the vehicle according to the disclosure, a high-pixel (for example, 8M-pixel) camera and a high-bandwidth and high-computing-power domain controller may be included in, for example, a visual perception system for autonomous driving. There are a series of dependency and constraint relationships between a total number of pixels of the image sensor and a number of pixels per unit area thereof, and a farthest distance detected based on a target detection algorithm, a signal-to-noise ratio and responsivity under different illumination conditions, a system bandwidth, a computing power of the domain controller, power consumption, etc. Moreover, the zoom mode of a single image sensor itself provides underlying technical support for configuration of different modes in different application scenarios. An objective of the disclosure is to configure the image sensor to operate in different operation modes according to different application scenarios, to meet requirements in different application scenarios and reduce power consumption of the system as far as possible.

In the example of the vehicle, the parameter data related to the moving scenarios of the vehicle may be, but is not limited to, any one or more of the following: an ambient light illumination, a movement speed, a sensing distance, etc.

The ambient light illumination represents a light intensity of an environment in which the movable object (for example, the vehicle) is located, and can be obtained by the image sensor and/or a light sensor. In an embodiment, image data obtained by the image sensor may be processed in a processing step (for example, the data processing step S220). For example, information about luminance may be extracted from the image data to obtain the luminance of a scenario displayed in the image. For example, the ambient light illumination may be obtained by using a luminance average of pixel data of the image in the data processing step S220. In addition, the ambient light illumination may be obtained by using a statistical value of pixel luminance of the image sensor. In another embodiment, the ambient light illumination may be obtained by using a special light sensor. The ambient light illumination may be obtained by alternatively using the image sensor or the light sensor, or by jointly using the two (for example, data from the image sensor and data from the light sensor are fused, complemented and corrected) to obtain the ambient light illumination.

For the description of the movement speed and the sensing distance, reference may be made to the foregoing corresponding content, which will not be repeated here. Although only three examples of the parameter data are given here, it should be understood that the parameter data may be any parameter data related to the moving scenarios that may be required for adjustment to settings of the active pixels of the image sensor. For example, the parameter data may be the number of obstacles within a certain range around the vehicle, etc.

In the instruction generation step S230, an instruction for controlling operation modes of the image sensor may be generated based on the parameter data, where the operation modes correspond to setting manners of active pixels of the image sensor. In some embodiments, the active pixels may be pixels for constituting a sensing image. In some embodiments, the active pixels may be sampled pixels. Sets of active pixels defined in different ways may coincide or intersect. For a multi-frame sensing image, and with reference to a high-resolution sensing mode (also referred to as "default mode" hereinafter) of the image sensor, the active pixels may vary in terms of number, and positions of the active pixels in an image (also referred to as "highest-resolution image" hereinafter) obtained in the highest-resolution sensing mode may vary. In addition, a single active pixel may not only correspond to one pixel in the highest-resolution image, and may also correspond to a plurality of pixels or a set of pixels in the highest-resolution image.

In the instruction generation step S230, an instruction for controlling operation modes of the image sensor is generated based on the parameter data. Specifically, each piece of parameter data may be compared with a preset threshold, and an operation instruction may then be generated based on a comparison result. This process is described in detail below.

In an embodiment, in consideration of the ambient light illumination, when a value of the obtained ambient light illumination is greater than a first preset ambient light illumination threshold, this indicates that a light intensity in an environment is enough for high-resolution imaging, and therefore, an instruction for controlling the image sensor to be maintained in the default mode or switch to the default mode may be generated in the instruction generation step S230. The default mode may include a mode in which a first set of pixels (for example, a set of all pixels of the image sensor) corresponding to a highest resolution of the image sensor serves as the active pixels. In other words, the default mode may correspond to a scenario in which imaging conditions are enough to generate a highest-quality image, and this is described as an example hereinafter. However, it should be understood that with the upgrade of hardware and more attention to user customization, a user may also select his/her desired default mode if permitted. For example, when driving a vehicle at night for a long term (in a scenario with a low value of ambient light illumination), a user may set the default mode as a mode that is favorable for nighttime sensing, such as a combination mode that will be described hereinafter. Alternatively, when expecting to save a system bandwidth or reduce power consumption, the user may set the default mode as a mode in which fewer pixels are sampled, such as a skipping mode that will be described hereinafter.

In an aspect, when the value of the obtained ambient light illumination is less than or equal to the first preset ambient light illumination threshold, this indicates that the light intensity in the environment is not enough for high-resolution imaging. Therefore, to prevent the frame of the sensing image from being too dark for human eyes to see and distinguish, an instruction for controlling the image sensor to enter the combination mode or to be maintained in the combination mode may be generated in the instruction generation step S230. For the combination mode, reference may be made to FIGS. 2a and 2b, and the foregoing description of FIGS. 2a and 2b.

In another aspect, when the value of the obtained ambient light illumination is greater than the first preset ambient light illumination threshold, this indicates that the light intensity in the environment is enough for high-resolution imaging. In this case, in the instruction generation step S230, the instruction for controlling the operation modes of the image sensor may also be generated according to a specific requirement such as a system requirement. The specific requirement includes any one or more of a bandwidth requirement, a power consumption requirement, and a computing power requirement. To save a system bandwidth and reduce power consumption, and perform matching with a computing power of the processing unit of the system, the skipping mode may be used where there is enough ambient light illumination. The skipping mode includes one or more skipping sub-modes in which pixels are selected from each of one or more subsets in the first set of pixels to serve as the active pixels. For the skipping mode, reference may be made to FIG. 2c and the foregoing description of FIG. 2c.

In an embodiment, the method 200 for controlling an image sensor may further include a data processing step S220. In the data processing step S220, a specific moving scenario may be determined from among the plurality of moving scenarios based on the parameter data, and the determined moving scenario is then applied in the instruction generation step S230. Correspondingly, in the instruction generation step S230, the instruction for controlling the operation modes of the image sensor may be generated based on the determined specific moving scenario.

In the instruction generation step S230, the corresponding instruction for controlling the operation modes of the image sensor may also be generated corresponding to a position at which the image sensor is disposed. An operation example of the data processing step S220 is given below by taking the image sensor in FIG. 3 as an example.

In a storage apparatus of a vehicle, one or more preset ambient light illumination thresholds, preset movement speed thresholds, preset sensing distance thresholds, etc. may be pre-stored for classification and determination of moving scenarios. A single preset ambient light illumination threshold and preset movement speed threshold is used as examples for description below. However, it should be understood that a plurality of thresholds of the same type may be set as needed, to more finely classify the moving scenarios.

In an embodiment, the data processing step S220 includes: determining a current scenario as a "low-illumination and low-speed" scenario when a value of the ambient light illumination does not exceed a first ambient light illumination threshold and the movement speed does not exceed a first movement speed threshold; determining the current scenario as a "low-illumination and high-speed" scenario when the value of the ambient light illumination does not exceed the first ambient light illumination threshold and the movement speed exceeds the first movement speed threshold; determining the current scenario as a "high-illumination and low-speed" scenario when the value of the ambient light illumination exceeds the first ambient light illumination threshold and the movement speed does not exceed the first movement speed threshold; and determining the current scenario as a "high-illumination and high-speed" scenario when the value of the ambient light illumination exceeds the first ambient light illumination threshold and the movement speed exceeds the first movement speed threshold.

In the "low-illumination and low-speed" scenario, the image sensor needs to have a large single-pixel light sensing area, to improve sensitivity to light in the scenario, thereby increasing a signal-to-noise ratio of imaging. In this case, a type of "low-illumination and low-speed" scenario may be determined by using the data processing step S220, and is then applied in the instruction generation step S230. In the instruction generation step S230, an instruction for controlling the image sensor to enter the combination mode described above or to be maintained in the combination mode may be generated according to the type of scenario. In this way, pixels of the resulting sensing image are reduced to 1/(M*N) that in the default mode. As shown in FIG. 4a, when M=N=2, cameras of five types are all zoomed down from an 8M-pixel mode to a 2M-pixel mode by using the sensor control step 240.

In the "low-illumination and high-speed" scenario, the image sensor needs to have a large single-pixel light sensing area, to improve sensitivity to light in the scenario, thereby increasing a signal-to-noise ratio of imaging. However, a relatively high movement speed of the vehicle imposes a relatively high requirement for the detection distance. In consideration of safety, a high-pixel mode may still be used for a front-view camera of the vehicle. In this case, a type of "low-illumination and high-speed" scenario may be determined by using the data processing step S220, and is then applied in the instruction generation step S230. In the instruction generation step S230, an instruction for controlling the image sensor, other than the front-view camera, to enter the combination mode described above or to be maintained in the combination mode may be generated according to the type of scenario. In this way, pixels of the resulting sensing image are reduced to 1/(M*N) that in the default mode. In addition, in the instruction generation step S230, an instruction for controlling the front-view camera to enter the default mode described above or to be maintained in the default mode may also be generated according to the type of scenario. As shown in FIG. 4b, when M=N=2, except for two front-view cameras that are maintained in an 8M default mode, cameras of the other three types are all zoomed down from an 8M-pixel mode to a 2M-pixel mode by using the sensor control step 240.

In the "high-illumination and low-speed" scenario, there is a relatively good light condition, and therefore, an imaging effect is usually better than that in a low-illumination scenario. In addition, a requirement for the detection distance is usually lower than that in the high-speed scenario. In this case, the image sensor can operate in a low-pixel mode, thereby meeting the specific requirement of the system and relieving the burden of bandwidth and computing power on the system, and reducing indicators such as power consumption of the system. In this case, a type of "high-illumination and low-speed" scenario may be determined by using the data processing step S220, and is then applied in the instruction generation step S230. In the instruction generation step S230, an instruction for controlling the image sensor to enter the skipping mode described above or to be maintained in the skipping mode may be generated according to the type of scenario. In this way, pixels of the resulting sensing image are reduced to 1/(M*N) that in the default mode. Since it is easier to obtain a high-quality sensing image in a moving scenario, in a case of ensuring safety, an instruction of turning off redundant front-view cameras may also be generated and only one or more necessary cameras remain turned on where there are a plurality of front-view cameras. In a case of more attention to safety, a high-pixel mode may still be used for the front-view camera of the vehicle. In this case, in the instruction generation step S230, an instruction for controlling the front-view camera to enter the default mode described above or to be maintained in the default mode may also be generated according to the type of scenario. As shown in FIG. 4c, when M=N=2, cameras of four types are zoomed down from an 8M-pixel mode to a 2M-pixel mode by using the sensor control step 240, and one front-view camera with a larger sensing distance and a 30° field of view is turned off With such a setting manner, the requirements for the bandwidth of the cameras and the computing power of the processing unit may be approximately lowered to ⅕ that in the default mode or even lower.

In the "high-illumination and high-speed" scenario, there is a relatively good light condition, and therefore, an imaging effect is usually better than that in the low-illumination scenario. In this case, a type of "high-illumination and low-speed" scenario may be determined by using the data processing step S220, and is then applied in the instruction generation step S230. In the instruction generation step S230, an instruction for controlling the image sensor to enter the skipping mode described above or to be maintained in the skipping mode may be generated according to the type of scenario. In this way, pixels of the resulting sensing image are reduced to 1/(M*N) that in the default mode. However, a relatively high movement speed of the vehicle imposes a relatively high requirement for the detection distance. In consideration of safety, a high-pixel mode may still be used for a front-view camera of the vehicle. Therefore, in the instruction generation step S230, an instruction for controlling the front-view camera to enter the default mode described above or to be maintained in the default mode may also be generated according to the type of scenario. As shown in FIG. 4c, when M=N=2, cameras of four types are zoomed down from an 8M-pixel mode to a 2M-pixel mode by using the sensor control step 240, and one front-view camera with a larger sensing distance and a 30° field of view is maintained in an 8M-pixel default mode.

Although the moving scenarios are simply classified into two types, i.e. low illumination and high illumination, in terms of light intensity by using the single preset ambient light illumination threshold above, the moving scenarios may also be simply classified into two types, i.e. low illumination and high illumination, by setting, for example, two preset ambient light illumination thresholds.

For example, in the data processing step S220, it may be determined to enter a high-illumination scenario when the ambient light illumination exceeds a first ambient light illumination threshold, and determined to enter a low-illumination scenario when the ambient light illumination exceeds a second ambient light illumination threshold, where the second ambient light illumination threshold is less than the first ambient light illumination threshold by an appropriate amount. With such a setting manner, an increase in the amount of computation of the system caused by frequent switching of the determined scenario between high illumination and low illumination when the ambient light illumination frequently fluctuates around the first ambient light illumination threshold can be avoided, thereby further reducing power consumption of the system.

The configuration methods of cameras in some specific scenarios are only given above. In other scenarios not mentioned in this specification, the plurality of cameras can also be adaptively zoomed and adjusted as required. In addition, depending on the speed of computation for each movable object, detection and distance performances for a sensing algorithm, etc., whether to zoom the image sensor may be determined based on the time required for the system to perform corresponding manipulation and control over varying scenarios.

In an embodiment, the method 200 for controlling an image sensor may further include a sensor control step S240. In the step, the operation modes of the image sensor are controlled in response to the instruction generated in the instruction generation step S230, so that the image sensor exits a certain operation mode (for example, the default mode, the skipping mode, or the combination mode), is maintained in a certain operation mode, or switches to a certain operation mode.

In the method 200 for controlling an image sensor according to one or more embodiments of the disclosure, a current scenario is determined based on a plurality of pieces of parameter data (for example, an ambient light illumination, a movement speed, etc.) and an operation mode of a vehicle-mounted image sensor is then set, thereby saving system resources such as bandwidth, power consumption, and computing power, and also achieving the optimal sensing effect.

According to still another aspect of the disclosure, there is provided a computer-readable storage medium having stored thereon program instructions executable by a processor, where when the program instructions are executed by the processor, the method for controlling an image sensor according to any embodiment of an aspect of the disclosure is implemented.

According to a further aspect of the disclosure, a movable object is provided, including the apparatus for controlling an image sensor according to any embodiment of an aspect of the disclosure.

As an alternative or addition to the foregoing solution, the movable object according to an embodiment of the disclosure is any one or more of a vehicle, a ship, an aircraft, and an elevator car.

According to the solutions of one or more embodiments of the disclosure, different operation modes are set for the image sensor in different scenarios, so that while sensing requirements in different scenarios are met, the power consumption can be reduced and requirements for a system can be lowered as far as possible.

The foregoing disclosure is not intended to limit the disclosure to specific forms or particular application fields that are disclosed. Therefore, it is contemplated that in view of the disclosure, various alternative embodiments and/or modifications, whether clearly described or implied in this specification, of the disclosure are possible. When the embodiments of the disclosure are described as such, those of ordinary skill in the art would appreciate that changes may be made in forms and details without departing from the scope of the disclosure. Therefore, the disclosure is subject only to the claims.

The invention claimed is:

1. An apparatus for controlling an image sensor, the apparatus comprising:
   a memory;
   a processor; and
   a computer program stored on the memory and executable on the processor, wherein the execution of the computer program causes the following steps to be performed:

obtaining parameter data related to one or more moving scenarios; and generating, based on the parameter data, an instruction for controlling operation mode of the image sensor, wherein the one or more moving scenarios are scenarios in which a movable object with the image sensor is located;

wherein the parameter data comprises an ambient light illumination which represents a light intensity of an environment in which the movable object is located and a sensing distance which represents a distance between an object sensed by the image sensor and the movable object; and wherein the operation modes correspond to setting manners of active pixels of the image sensor, wherein the active pixels are pixels for constituting a sensing image, wherein the ambient light illumination is obtained by the image sensor, wherein the generating of the instruction comprising: determining a specific moving scenario from the one or more moving scenarios based on the ambient light illumination; and generating, based on the determined specific moving scenario, the instruction for controlling the operation modes of the image sensor, wherein the specific moving scenario includes a high-illumination scenario and a low-illumination scenario, wherein the operation mode comprise a default mode in which a first set of pixels corresponding to a highest resolution of the image sensor serves as the active pixels, a skipping mode in which pixels are selected from each of one or more subsets in the first set of pixels to serve as the active pixels, and a combination mode in which pixels from one or more subsets in the first set of pixels are combined to serve as the active pixels, wherein the default mode is performed when the specific moving scenario is the high-illumination scenario, and the combination mode is performed when the specific moving scenario is the low-illumination scenario, and the skipping mode is performed when the specific moving scenario is the high-illumination scenario and there is a requirement on at least of bandwidth, power consumption and computing power.

2. The apparatus according to claim 1, wherein the parameter data further comprises:
a movement speed which represents a moving speed of the movable object.

3. The apparatus according to claim 1, wherein the execution of the computer program further causes the following steps to be performed:
generating, according to a specific requirement, the instruction for controlling the operation modes of the image sensor, the specific requirement including at least one of a bandwidth requirement, a power consumption requirement, and a computing power requirement.

4. The apparatus according to claim 1, wherein the execution of the computer program further causes the following steps to be performed:
generating, corresponding to a position at which the image sensor is disposed, the corresponding instruction for controlling the operation modes of the image sensor.

5. A movable object, comprising the apparatus for controlling an image sensor according to claim 1.

6. A method for controlling an image sensor, the method comprising:
a data obtaining step of obtaining parameter data related to one or more moving scenarios; and
an instruction generation step of generating, based on the parameter data, an instruction for controlling operation modes of the image sensor,
wherein the one or more moving scenarios are scenarios in which a movable object with the image sensor is located; and
wherein the parameter data comprises an ambient light illumination which represents a light intensity of an environment in which the movable object is located and a sensing distance which represents a distance between an object sensed by the image sensor and the movable object,
wherein the operation modes correspond to setting manners of active pixels of the image sensor,
wherein the active pixels are pixels for constituting a sensing image,
wherein the ambient light illumination is obtained by the image sensor,
wherein the instruction generation step comprising: determining a specific moving scenario based on the ambient light illumination; and generating, based on the determined specific moving scenario, the instruction for controlling the operation modes of the image sensor,
wherein the specific moving scenario includes a high-illumination scenario and a low-illumination scenario,
wherein the operation mode comprise a default mode in which a first set of pixels corresponding to a highest resolution of the image sensor serves as the active pixels, a skipping mode in which pixels are selected from each of one or more subsets in the first set of pixels to serve as the active pixels, and a combination mode in which pixels from one or more subsets in the first set of pixels are combined to serve as the active pixels,
wherein the default mode is performed when the specific moving scenario is the high-illumination scenario, and the combination mode is performed when the specific moving scenario is the low-illumination scenario, and the skipping mode is performed when the specific moving scenario is the high-illumination scenario and there is a requirement on at least of bandwidth, power consumption and computing power.

7. The method according to claim 6, wherein the parameter data further comprises:
a movement speed which represents a moving speed of the movable object.

8. The method according to claim 6, wherein the instruction generation step further comprises:
generating, according to a specific requirement, the instruction for controlling the operation modes of the image sensor, the specific requirement including at least one of a bandwidth requirement, a power consumption requirement, and a computing power requirement.

9. The method according to claim 6, wherein the instruction generation step further comprises:
generating, corresponding to a position at which the image sensor is disposed, the corresponding instruction for controlling the operation modes of the image sensor.

* * * * *